United States Patent
Lin et al.

(10) Patent No.: US 9,251,674 B2
(45) Date of Patent: Feb. 2, 2016

(54) HUMAN MACHINE INTERFACE AND ALERT DISPLAY METHOD

(71) Applicant: BenQ Corporation, Taipei (TW)

(72) Inventors: Hsin-Nan Lin, Taipei (TW); Tzu-Pang Chiang, Taipei (TW); Kuo-Chun Lee, Taipei (TW)

(73) Assignee: BenQ Corporation, Taipei (TW)

( * ) Notice: Subject to any disclaimer, the term of this patent is extended or adjusted under 35 U.S.C. 154(b) by 172 days.

(21) Appl. No.: 13/946,062

(22) Filed: Jul. 19, 2013

(65) Prior Publication Data

US 2014/0022087 A1 Jan. 23, 2014

(30) Foreign Application Priority Data

Jul. 20, 2012 (TW) .............. 101126251 A (51) Int. Cl.
- *G08B 5/00* (2006.01)
- *H04N 7/18* (2006.01)
- *G08B 5/36* (2006.01)
- *G08B 13/196* (2006.01)

(52) U.S. Cl.
CPC ............. *G08B 5/00* (2013.01); *H04N 7/183* (2013.01); *G08B 5/36* (2013.01); *G08B 13/19691* (2013.01)

(58) Field of Classification Search
CPC ....................................................... G08B 5/00
USPC ........................................................ 340/691.5
See application file for complete search history.

(56) References Cited

U.S. PATENT DOCUMENTS

| | | | | |
|---|---|---|---|---|
| 6,411,198 B1* | 6/2002 | Hirai et al. | ..... | 340/7.6 |
| 2007/0162582 A1* | 7/2007 | Belali et al. | ..... | 709/223 |
| 2009/0010466 A1* | 1/2009 | Haikonen | ..... | 381/315 |
| 2010/0254554 A1* | 10/2010 | Fusakawa et al. | ..... | 381/315 |

FOREIGN PATENT DOCUMENTS

| | | |
|---|---|---|
| CN | 101695110 A | 4/2010 |
| TW | 200727134 A | 7/2007 |

OTHER PUBLICATIONS

Office Action of counterpart application by Taiwan IP Office on Sep. 30, 2014.

* cited by examiner

*Primary Examiner* — Kerri McNally (57) ABSTRACT

A human machine interface includes a display screen coupled to a processing device. The display screen is disposed on a case and displays an image frame. In the processing unit, a comparing module compares a first trigger signal stored in a storage unit with a monitored signal transmitted from a signal source. A notification signal is generated when the first trigger signal is detected appearing in the monitored signal. A control module receives the notification signal and generates a first alert signal to display in the image frame or on the case.

28 Claims, 10 Drawing Sheets

HUMAN MACHINE INTERFACE AND ALERT DISPLAY METHOD

BACKGROUND OF THE INVENTION

1. Field of the Invention

The present invention relates to a human machine interface and an alert display method; in particular, the present invention relates to a human machine interface and an alert display method to facilitate user's perception of an alert signal.

2. Description of the Prior Art

In the prevailing era of personal computer and network, computers have become an indispensable part in our life. When people use a computer, they usually open several windows on the screen, but are often fully occupied to a certain one and easily miss some information required to be noticed immediately. Sometimes, people may neglect ambient sounds while wearing an earphone and inevitably miss some information. Besides, when people do not operate keyboard and mouse for a while, the display will switch to a standby state for saving energy and stopping outputting image frames, but the computer is still working. If people want to know whether there is any important information, they have to operate keyboard or mouse again to activate the display from standby state, and it is not convenient.

Similar situation may be occurred while people are playing games. Taking multiplayer online game as an example, when a player is executing a mission, he/she may pay attention to the mission and the developments of enemy. Those developments can be classified into several items, and the player may easily miss important information if he/she merely depends on listening to audio from the earphone and watching image frames on the display. Therefore, a few human machine interfaces such as keyboard, mouse, and earphone can emit light in response to the developments of enemy.

However, the aforementioned human machine interfaces cannot obtain game state encoding and data transmission interface format without licensing from the game company. After obtaining authorization, the human machine interfaces can correctly read each command or state information when the game is running, and then the human machine interfaces may change the lighting state in response to the progressing of the game. For a manufacturer who could not afford high royalty to the game company, the manufacturer cannot develop such a human machine interface product that can change the lighting state.

SUMMARY OF THE INVENTION

One object of the present invention is to provide a human machine interface to facilitate a user's perception of an alert signal by changing the screen image or flashing a warning light on the display, so that the user can notice the alert signal immediately.

Another object of the present invention is to provide a human machine interface that can generate an alert signal by monitoring and comparing video signals from an executing game without modifying the game state encoding and data transmission interface format that requires authorization from a specific game program.

The computer system includes a human machine interface, which includes a display screen and is coupled to a processing device. The display screen is disposed on a case to display an image frame. In the processing device, a comparing module compares a first trigger signal stored in a storage unit with a monitored signal transmitted from the signal source. The comparing module generates a notification signal when the comparing module detects the first trigger signal appearing in the monitored signal. After receiving the notification signal, the control module generates a first displaying signal to display a first alert signal in the image frame or on the case.

The alert display method includes the following steps: storing a first trigger signal in a storage unit; comparing the first trigger signal with the monitored signal; generating a notification signal when the first trigger signal appears in the monitored signal; and generating a first displaying signal to display a first alert signal on the case when receiving the notification signal.

DETAILED DESCRIPTION OF THE PREFERRED EMBODIMENT

Figure 1A:
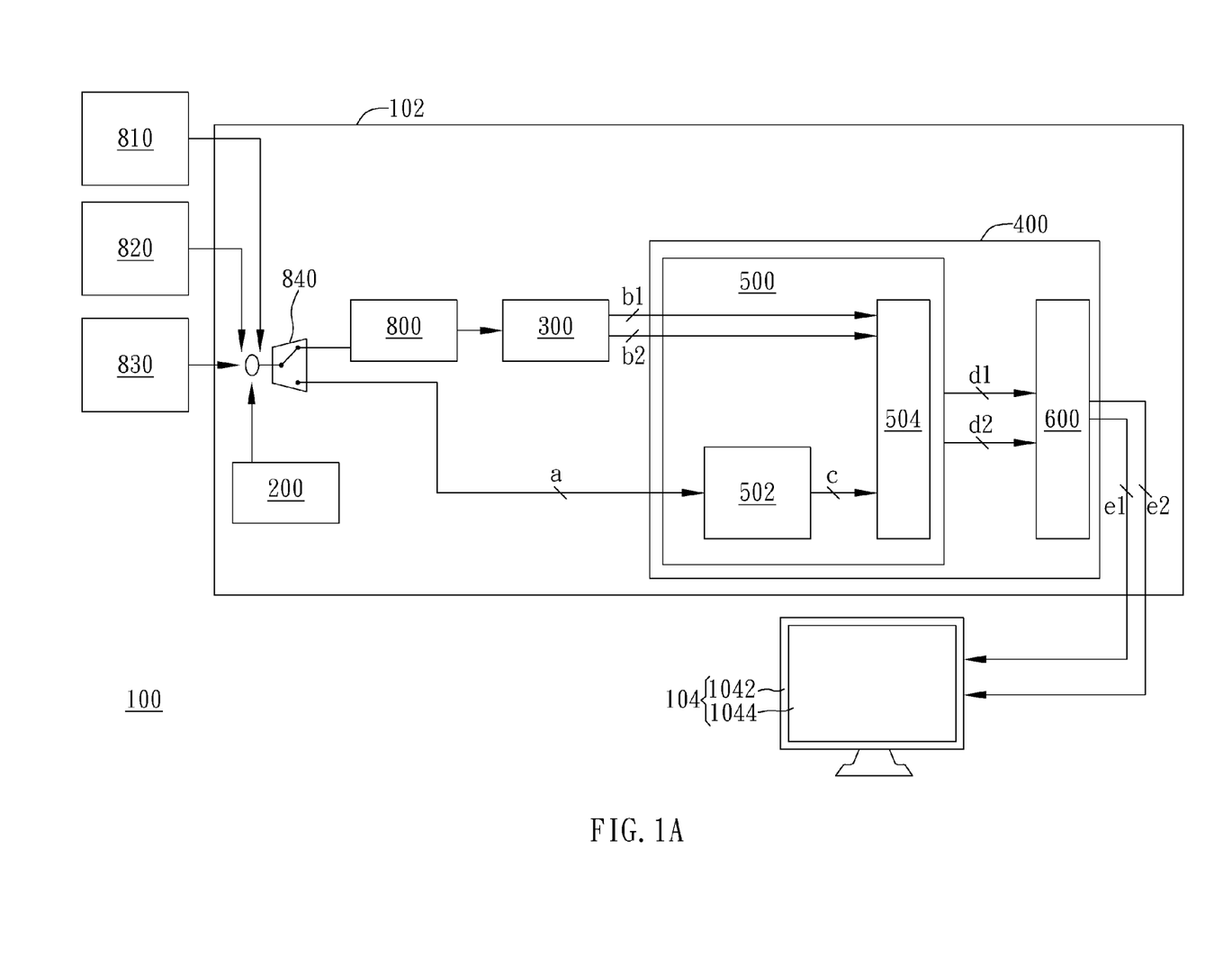
FIG. 1A is a schematic view of an embodiment of a computer system.

FIG. 1A is a schematic view of an embodiment of a computer system 100. As shown in FIG. 1A, the computer system 100 includes a processing device 102 and a human machine interface 104 externally connected to the processing device 102. In this embodiment, the human machine interface 104 is a display 104. The display 104 has a case 1042 and a display screen 1044 disposed on the case 1042. The display 104 receives and displays an image frame from the processing device 102. In other embodiments, the human machine interface 104 can be a keyboard, a mouse, an earphone, a speaker, a remote control, or other devices that can communicate with the processing device 102.

The processing device 102 may be a personal computer, a tablet PC, or other suitable computing devices. The processing device 102 may include a multiplexer 840, a signal source 200, a recording module 800, and a storage unit 300.

The signal source 200 may be a multimedia display program such as Windows Media Player which can display files of MP3 or H.264 to output images and audio, a computer game program which can output image and sound effect of game, or a computer operating system which has a preset sound effect. For example, Win 7 may output different sound effects in response to different situations such as power on/power off/alert for low power/receipt of new mails. The signal source 200 may be a microphone coupled to the processing device 102, such as headphone or desktop phone. In other embodiments, the signal source 200 may be a camera, such as handheld camera or web cam. Therefore, a monitored signal can be an ambient sound or image, i.e. sound or image from the surrounding.

The storage unit 300, a comparing module 500, and a control module 600 may be specific hardware circuits in the processing device 102 or may be application programs or drivers that are bundled with the human machine interface 104 and reside in the memory for execution after the processing device 102 is activated.

When the multiplexer 840 chooses a first path (e.g. at the upper position of FIG. 1A), a first trigger signal (b1) and a second trigger signal (b2) will be retrieved by the recording module 800 and stored in the storage unit 300. The first trigger signal (b1) and the second trigger signal (b2) are, for example, a part of built-in sound effect in a game from the signal source 200, or a part of voice signal from a microphone input signal 820, or a part of a digital image from a photo file 810 in a card reader.

In a preferred embodiment, the computer system 100 mainly utilizes the processing device 102 to determine the generation of alert signals on the display 104 if some conditions are met, facilitating user's perception of the necessary information. For example, the processing device 102 continuously monitors an ambient sound or audio of a sound card, and an alert signal is generated when the ambient sound or the audio of the sound card matches the first trigger signal (b1) or the second trigger signal (b2).

For a user sitting and operating in front of the display 104, user's attention usually focuses on the display screen 1044. If changes of alert signals are displayed on the case 1042 around the display screen 1044, it will provide a better notifying effect.

For other onlookers behind the display 104, the case 1042 has a fairly large area. Therefore, if changes of alert signals are displayed on the case 1042 opposite to the display screen 1044, it will also provide a better notifying effect to those onlookers.

When the multiplexer 840 chooses a second path (e.g. at the lower position of FIG. 1A), a monitored signal (a) is transmitted by the signal source 200, and then is retrieved by the comparing module 500 to be compared with the first trigger signal (b1) and the second trigger signal (b2). To be detailed, the monitored signal (a) is retrieved in a predetermined period by a signal retrieving unit 502 of the comparing module 500, and then the signal retrieving unit 502 transmits a comparison signal (c) to a comparing unit 504. The comparison signal (c) is compared with the first trigger signal (b1) and the second trigger signal (b2) by the comparing unit 504.

As shown in FIG. 1A, a human machine interface program 400 is executed in the processing device 102 and includes the comparing module 500 and the control module 600. Once the human machine interface program 400 is activated, it is resided and executed in a random access memory without interfering other programs or computer games operated on the display screen 1044 by the user.

In other embodiments, in addition to the use of the multiplexer 840 choosing the signal input path, the signal source 200 may be utilized to transmit the monitored signal (a) to the comparing module 500, and the recording module 800 may be utilized to retrieve a part of the monitored signal (a) in advance to form the first trigger signal (b1) and the second trigger signal (b2). Also, the recording module 800 may be utilized to retrieve necessary information as the first trigger signal (b1) directly from the photo file 810, the microphone input signal 820, or the web cam output signal 830 and then store the first trigger signal (b1) in the storage unit 300. The comparing module 500 directly retrieves the monitored signal (a) from the signal source 200 to compare with the first trigger signal (b1) and the second trigger signal (b2) in the storage unit 300.

Figure 1B:
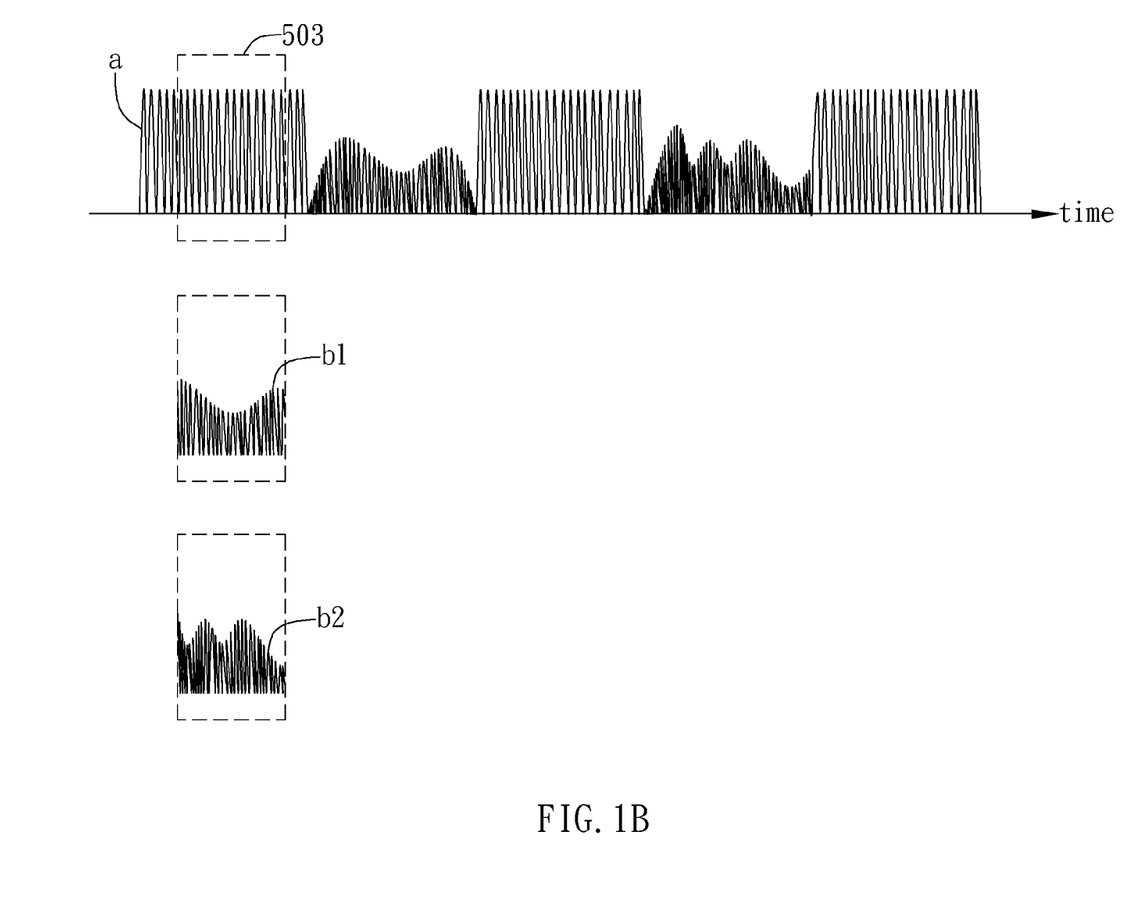
FIG. 1B is a schematic view of a monitored signal and trigger signals.

The first trigger signal (b1) and the comparison signal (c) are usually in a sinusoid waveform along the time axis. For example, the first trigger signal (b1) and the comparison signal (c) are audio signals, but not limited thereto. The first trigger signal (b1) and the comparison signal (c) may also be video signals distributed along x-axis and y-axis. Please refer to FIG. 1A and FIG. 1B. FIG. 1B is a schematic view showing how to retrieve and generate the comparison signal (c) from the monitored signal (a). As shown in FIG. 1B, the monitored signal (a) has different waveforms along the time axis. On the other hand, the storage unit 300 stores the first trigger signal (b1) and the second trigger signal (b2), as the two signals of different waveform shown in FIG. 1B. Every time the time window 503 moves one step further to the right along the time axis, the signal retrieving unit 502 will retrieve the monitored signal (a) within the time window 503 to form the comparison signal (c), and the comparing unit 504 will compare the comparison signal (c) with the first trigger signal (b1) and the second trigger signal (b2) once.

When the first trigger signal (b1) or the second trigger signal (b2) substantially matches the comparison signal (c) or the difference between the trigger signal (b1 or b2) and the comparison signal (c) is within an acceptable tolerance, the first trigger signal (b1) or the second trigger signal (b2) is determined appearing in the monitored signal (a). The comparing module 500 then outputs a notification signal (d1) or (d2). When the first trigger signal (b1), the second trigger signal (b2), and the comparison signal (c) are images, an image identification method may be adopted for use in the comparison.

In the aforementioned embodiment, the first trigger signal (b1) maybe human voice and the comparison signal (c) maybe sound effect preset in a game. In this situation, the waveform of two signals may not be completely the same; therefore, a user can set a system sensitivity by adjusting a reasonable tolerance based on the first trigger signal (b1). For example, when the waveform of the comparison signal (c) is similar to that of the first trigger signal (b1) and the difference thereof is within the tolerance, the comparison signal (c) and the first trigger signal (b1) are determined to substantially match with each other. Besides, in order to exclude sound quality difference among voices of different persons or among sound effects of different computer games, the voice recognition method may be utilized. When the comparison signal (c) and the first trigger signal (b) both correspond to same words, such as "we are under attack", the comparison signal (c) and the first trigger signal (b) are determined to substantially match with each other.

As shown in FIG. 1A, in another embodiment, the monitored signal (a) may be an output signal from an internal sound effect device of the processing device 102. For example, the monitored signal (a) is a signal coming from the sound card which serves as the signal source 200, and the signal retrieving unit 502 includes an internal sound effect retrieving device to retrieve the monitored signal (a). In another embodiment, the monitored signal (a) may be sounds or images from the surrounding (i.e. the ambient sounds or images). For example, the monitored signal (a) is an output signal coming from the audio line out of an external speaker which is driven by the processing device 102, or a video received by the web cam output signal 830, and the signal retrieving unit 502 includes a DSP hardware or a digital signal processing program to retrieve a part of the monitored signal (a) in the time window 503.

In addition, as shown in FIG. 1A, the recording module 800 can retrieve the monitored signal (a) in advance through the signal source 200, and then stores it in the storage unit 300 to form the first trigger signal (b1) or the second trigger signal (b2). The recording module 800 may be a resident program executed in the system. Therefore, when the signal source 200

(for example, the computer game program) is outputting an image frame or a sound effect of the game (i.e. outputting the monitored signal by a display unit, such as a display screen or a speaker), the user may activate a first hot key, combo key, or other methods to drive the recording module 800 to record the first trigger signal (b1). Then, the user can activate a second hot key, combo key, or other methods to drive the recording module 800 to stop recoding the first trigger signal (b1) without obstructing or interrupting the computer game. Even if the recording module 800 is not a resident program, it can be an application program executed in the system by the user to perform the recording. Besides, as mentioned above, the first trigger signal (b1) and the second trigger signal (b2) may be retrieved from the output signal of the internal sound effect device, or from the image or sound of the surrounding, but not limited thereto. As shown in FIG. 1A, the recording module 800 may obtain information directly from the photo file 810 or the microphone input signal 820, and then stores information in the storage unit 300 as the first trigger signal (b1) or the second trigger signal (b2). As mentioned above, the user may, according to requirements, preset information to be compared. For example, the user can play the game to exhibit a specific sound effect and retrieve a part of the sound effect as the first trigger signal (b1) by the resident program, or the user can ask his/her company to speak some specific words (such as "our troop is under attack" described in the embodiment of FIG. 4A) and prerecord the pronunciation of words of his/her company as the first trigger signal (b1).

When the control module 600 receives from the comparing module 500 a first notification signal (d1), which stands for "the comparison signal (c) and the first trigger signal (b1) substantially match", a first displaying signal (e1)) will be outputted to generate a first alert signal. The first alert signal is displayed in the image frame or on the case 1042. Similarly, when the comparison signal (c) and the second trigger signal (b2) substantially match and the control module 600 receives a second notification signal (d2), a second displaying signal (e2) will be outputted to generate a second alert signal. The first alert signal and the second alert signal may be changes of lighting state of a warning unit mounted on the case 1042 or changes of image frame displayed on the display screen 1044. By differentiating the first alert signal and the second alert signal with color, amount, location, frequency, etc., the user may readily identify different alert signals.

In other embodiments, another trigger signal may be utilized to deactivate an activated alert signal. For example, when the comparison signal (c) and the first trigger signal (b1) substantially match, the control module 600 outputs the first displaying signal (e1)) to correspondingly generate the first alert signal; when the comparison signal (c) and the second trigger signal (b2) substantially match, the control module 600 then outputs the second displaying signal (e2) to correspondingly deactivate the first alert signal. For example, the user prerecords a sound effect of "missile launch" of a game as the first trigger signal (b1) and "missile hits the ground" of the game as the second trigger signal (b2). The control module 600 outputs the first displaying signal (e1)) to correspondingly generate the first alert signal when the sound effect of "missile launch" appears in the game, and the control module 600 outputs the second displaying signal (e2) to correspondingly deactivate the first alert signal when the sound effect of "missile hits the ground" appears in the game.

Figure 2:
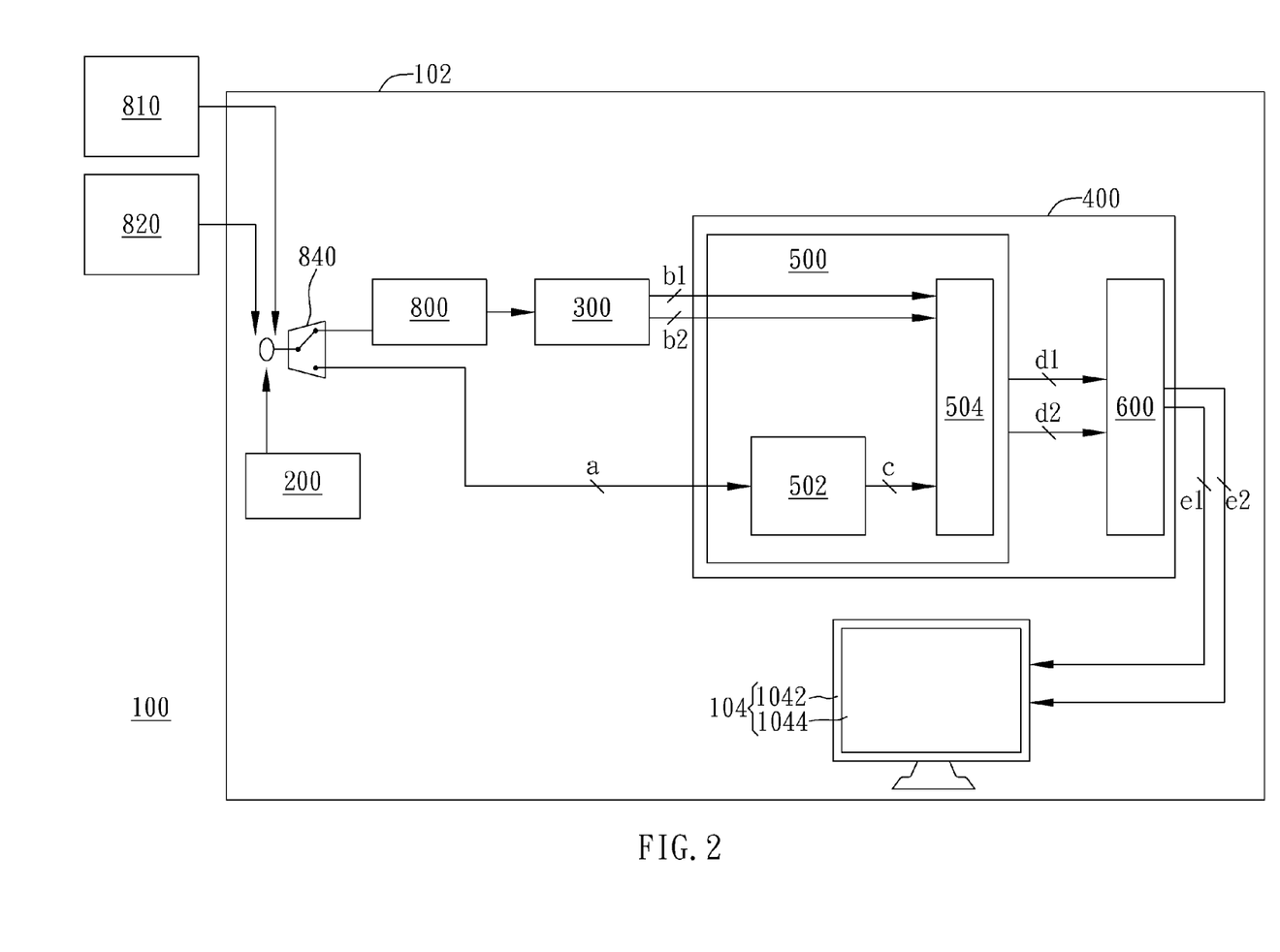
FIG. 2 is a schematic view of another embodiment of a computer system.

FIG. 2 is a schematic view of another embodiment of a computer system 100. As shown in FIG. 2, the computer system 100 is an All in One PC which integrates the processing device 102 with the display 104. The display 104 includes the case 1042 and the display screen 1044 disposed on the case 1042 for displaying images. The processing device 102 mainly includes the signal source 200, the recording module 800, and the storage unit 300. The storage unit 300 stores the first trigger signal (b1), such as built-in sound effects, human voices, digital images, and so on. The computer system 100 outputs signals to the display 104 through the processing device 102, so that the user can immediately obtain required information. The transmission process of signals is similar to those mentioned above and will not be elaborated hereinafter.

Figure 3A:
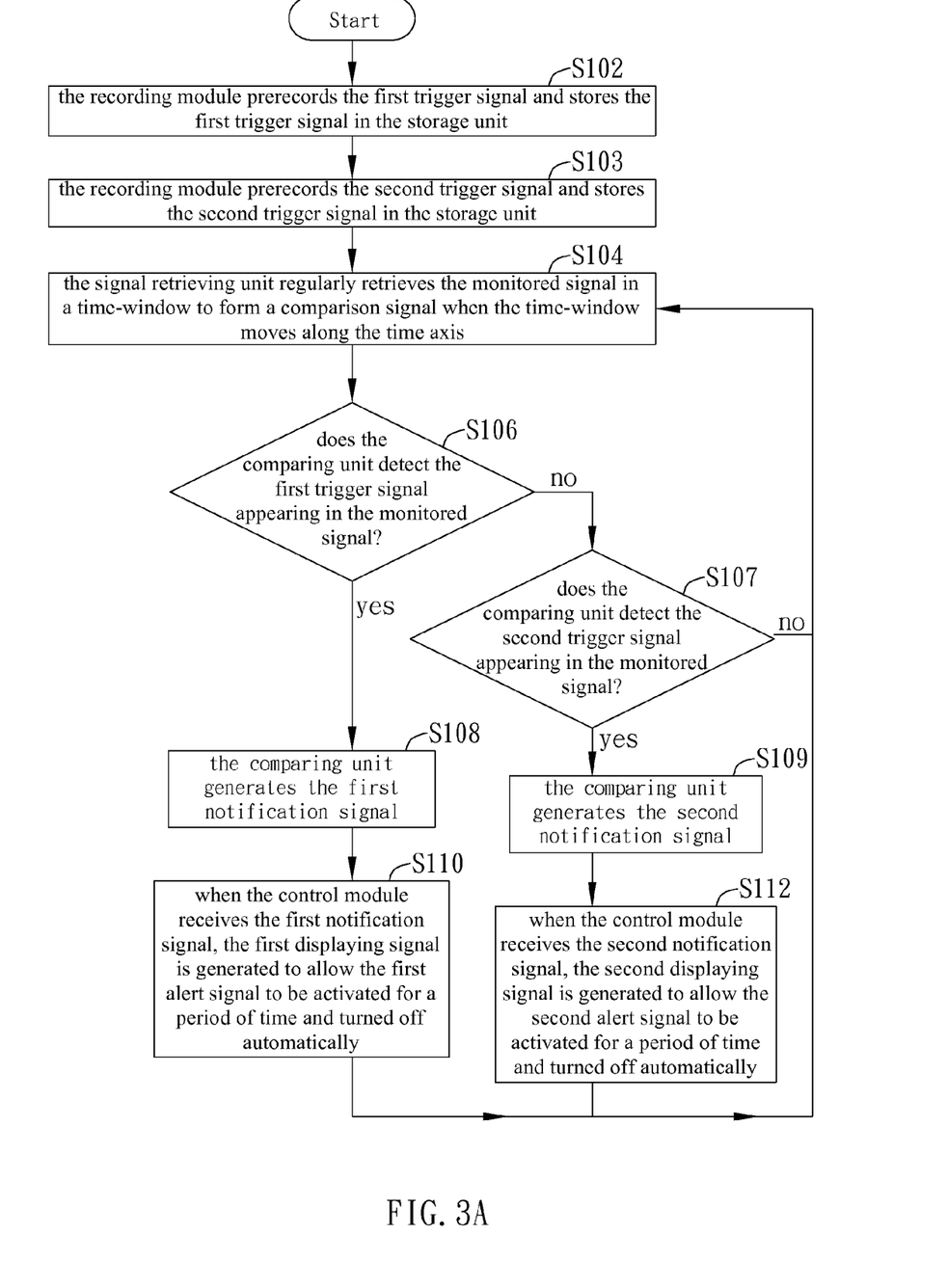
FIG. 3A and FIG. 3B are flowcharts of different embodiments of comparing and generating a notification signal.

FIG. 3A is a flowchart of an embodiment of "after the first trigger signal is received, the first alert signal is activated for a period of time and then turned off automatically; after the second trigger signal is received, the second alert signal is activated for a period of time and then turned off automatically". The method of displaying alert signals includes the following steps:

S102: the recording module 800 prerecords the first trigger signal (b1) and stores the first trigger signal (b1) in the storage unit 300.

S103: the recording module 800 prerecords the second trigger signal (b2) and stores the second trigger signal (b2) in the storage unit 300.

S104: the signal retrieving unit 502 regularly retrieves the monitored signal within a time-window to form a comparison signal when the time-window moves along the time axis.

S106: determining whether the comparing unit 504 detects the first trigger signal appearing in the monitored signal?

S107: determining whether the comparing unit 504 detects the second trigger signal appearing in the monitored signal?

S108: the comparing unit 504 generates the first notification signal (d1)) if the comparing unit 504 detects the first trigger signal appearing in the monitored signal.

S109: the comparing unit 504 generates the second notification signal (d2) if the comparing unit 504 detects the second trigger signal appearing in the monitored signal.

S110: when the control module 600 receives the first notification signal (d1), the first displaying signal (e1) is generated to allow the first alert signal to be activated for a period of time and then turned off automatically.

S112: when the control module 600 receives the second notification signal (d2), the second displaying signal (e2) is generated to allow the second alert signal to be activated for a period of time and then turned off automatically.

The first alert signal may be displayed in the image frame, on the case, or on both the image frame and the case for a period of time and then stopped being displayed automatically. If the user sets the first alert signal to be displayed in the image frame, the first displaying signal (e1) will change the image frame in the display screen 1044, and the image frame will be switched from a normal display tone to a warning display tone for lasting about five seconds, for example. After five seconds, the image frame will go back to the normal display tone automatically. As such, the only change is the display characteristics of the image frame (such as color temperature, tone, contrast, and other display parameters) without changing frame of a game or any literal and graphical content displayed in the image frame, and the user still can keep playing the game. If the user sets the first alert signal to be displayed on a warning unit which is disposed on the case 1042, the first displaying signal (e1) will change a state of the warning unit, such as flashing red light for about five seconds. After five seconds, the warning unit will go back to the normal display tone automatically.

Taking the game "Starcraft 2" as an example, during the playing of Starcraft 2:

(a) if our troop is not under attack and no nuclear launch is detected, other sound effects of war are outputted by the game and the warning unit 106 is not activated.
(b) the sound effect of "our troop is under attack" is outputted by the game when our troop is attacked by general weapons. This sound effect will be retrieved by the signal retrieving unit 502 and compared with the first trigger signal (b1). After this sound effect is found substantially matching the first trigger signal (b1) by the comparing unit 504, the control module 600 will generate the first displaying signal (e1), so that the warning unit 106 starts to flash yellow light for five seconds, and the image frame is switched to the warning display tone for five seconds.
(c) the sound effect of "nuclear launch detected" is outputted by the game when enemy launches a special nuclear weapon. This sound effect will be retrieved by the signal retrieving unit 502 and compared with the second trigger signal (b2). After this sound effect is found substantially matching the second trigger signal (b2) by the comparing unit 504, the control module 600 will generate the second displaying signal (e2), so that the warning unit 106 starts flashing red light for five seconds, and the image frame is switched to the warning display tone for five seconds.

In the present embodiment, the user may omit the setting of the second trigger signal (b2), so that the second notification signal (d2) and the second displaying signal (e2) will not be generated, and the corresponding steps in FIG. 3A can be omitted.

Figure 3B:
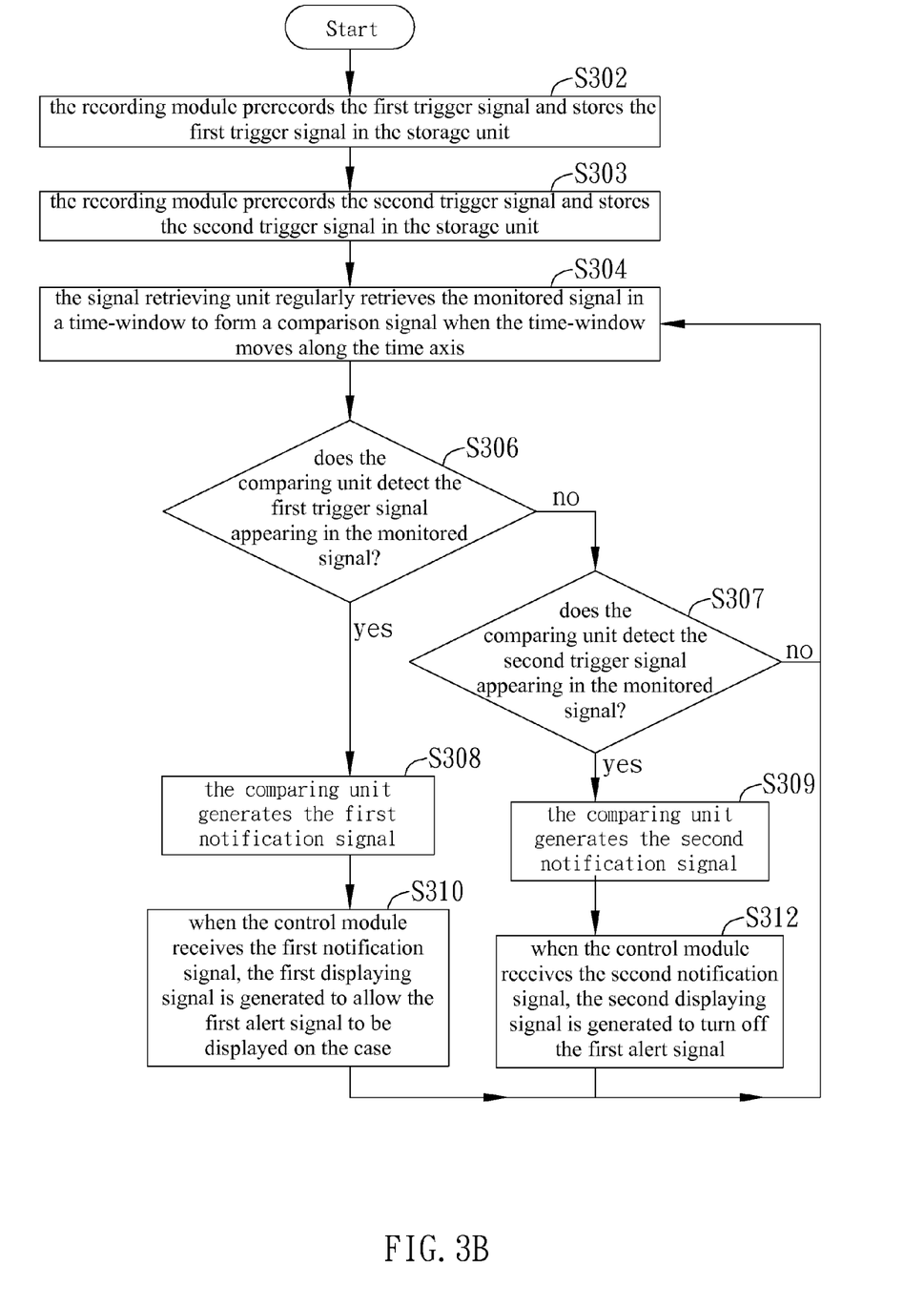

FIG. 3B is a flowchart of an embodiment of "(a) after the first trigger signal is received, the first alert signal is activated; (b) after the second trigger signal is received, the first alert signal is turned off". The method of generating alert signals includes the following steps:
S302~S309: corresponding to S102~S109 shown in FIG. 3A.
S310: when the control module 600 receives the first notification signal (d1), the first displaying signal (e1) is generated to allow the first alert signal to be displayed on the case 1042.
S312: when the control module 600 receives the second notification signal (d2), the second displaying signal (e2) is generated to turn off the first alert signal.

For example, during the playing of Starcraft 2:
(a) if no nuclear launch is detected, other sound effects of war are outputted by the game and the warning unit 106 is not activated.
(b) the sound effect of "nuclear launch detected" is outputted by the game when enemy launches a special nuclear weapon. After this sound effect is retrieved and detected, the comparing unit 504 will generate the first notification signal (d1) and the control module 600 will generate the first displaying signal (e1), so that the warning unit 106 starts to flash red light, and the image frame is switched to the warning display tone.
(c) the sound effect of "nuclear hits and blasts" is outputted by the game when the nuclear launched by enemy hits the ground and blasts. After this sound effect is retrieved and detected, the comparing unit 504 will generate the second notification signal (d2) and the control module 600 will stop displaying the first displaying signal (e1), so that the warning unit 106 stops flashing red light, and the image frame is switched back to the normal display tone.

Figure 4A:
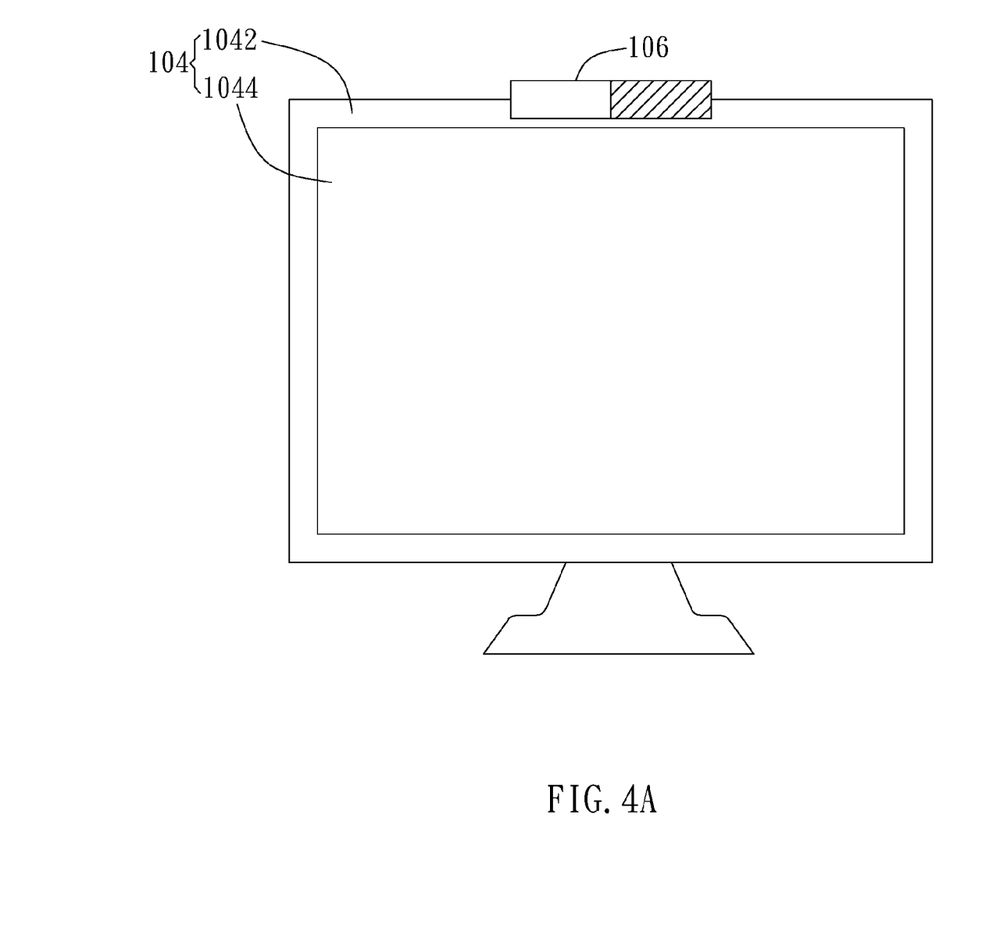
FIGS. 4A to 4C are schematic views of different embodiments of displaying an alert signal.
Figure 4B:
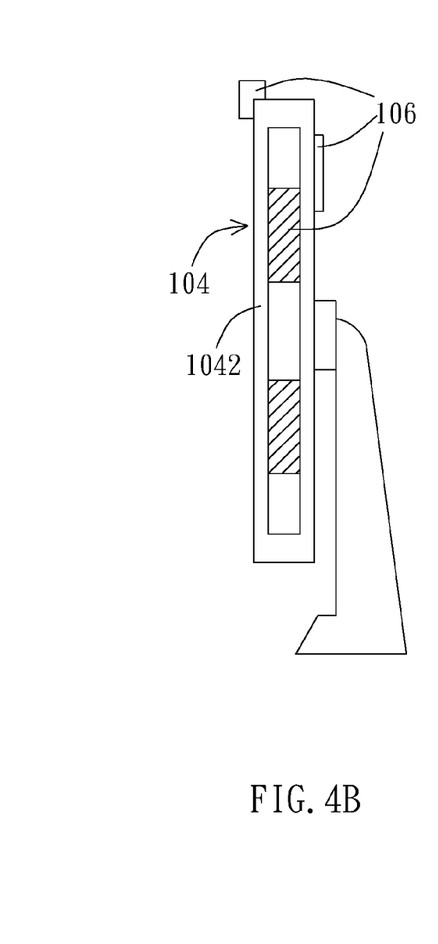

FIGS. 4A and 4B are schematic views of different embodiments of displaying alert signals. As shown in FIGS. 4A and 4B, the warning unit 106 (such as color changeable LEDs) can be disposed on different locations, such as on a side surface, a rear surface, or top surface of the display 104.

The state of the warning unit 106, such as location of flashing light, flashing frequency, and number of flashing light, may be changed based on the first displaying signal (e1) and the second displaying signal (e2). For example, when the control module 600 generates the first displaying signal (e1), the warning unit 106 composed of ten LEDs and disposed on the side surface of the case will slowly flash yellow light as the first alert signal. When the control module 600 generates the second displaying signal (e2), the warning unit 106 composed of twenty LEDs and disposed on the top surface of the case will rapidly flash red light as the second alert signal.

Figure 4C:
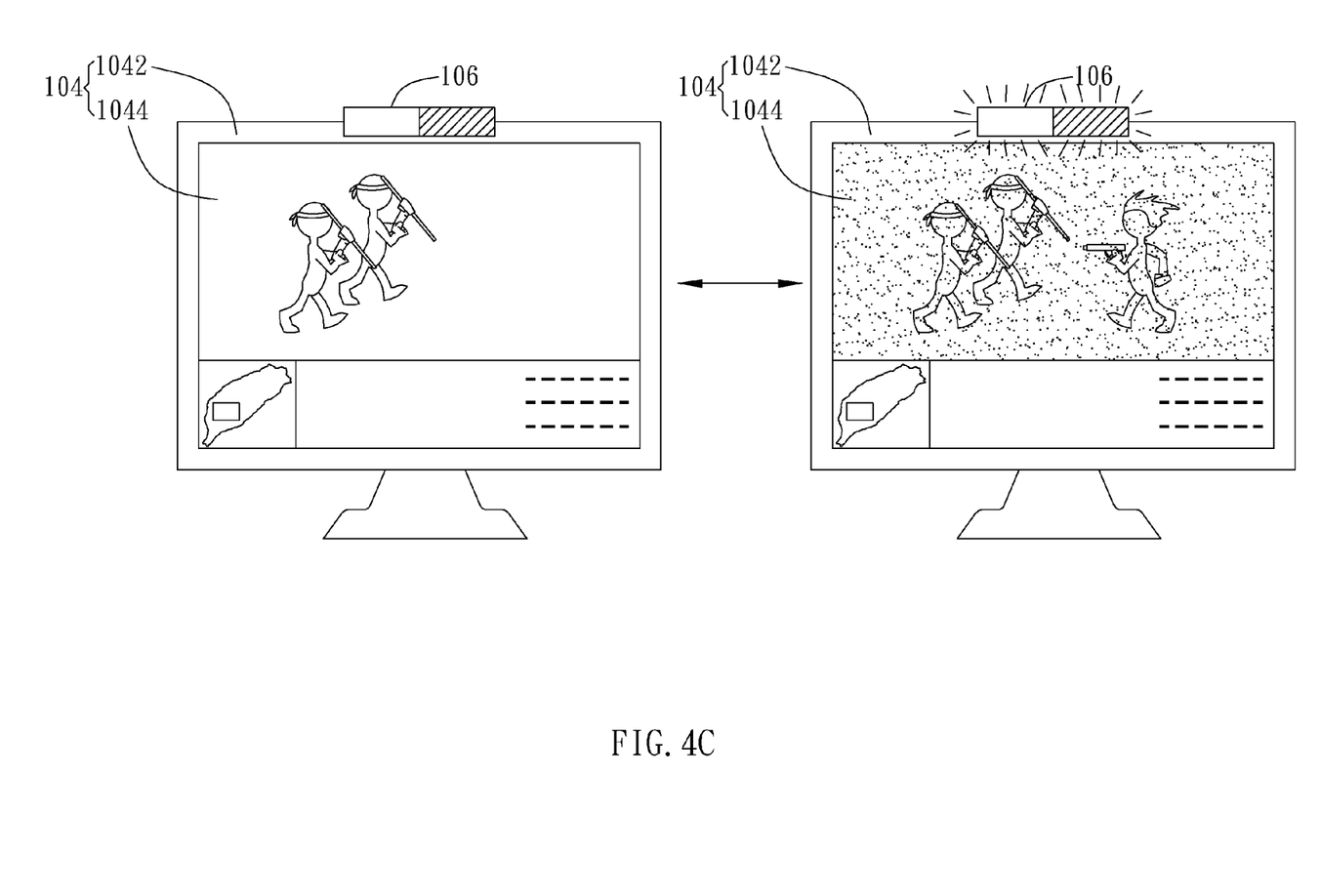

FIG. 4C is a schematic view of an embodiment of "the alert signal is displayed on the display screen". For example, as the scenario (a) described in the embodiment of FIG. 4A happens, i.e. if our troop is not under attack, the display screen 1044 displays the normal display tone (such as the left image displayed in FIG. 4C). As the scenario (b) described in the embodiment of FIG. 4A happens, i.e. if our troop is under attack, the control module 600 generates the first displaying signal (e1) so that image frame is switched to the warning display tone as the first alert signal. For example, the image frame is adjusted to present a red tone image (such as the right image displayed in FIG. 4C), or the brightness of the image may be adjusted to present a flashing effect. As such, the user can obtain important messages even if the screen he/she explores does not have any attacking events. With such configurations, when the user concentrates on the display screen 1044, the user can capture important messages required to be noticed through the change of the warning unit 106 and the image frame within his eyesight without significantly shifting his view angle which may lead to distraction. In addition, the user himself may set required video and audio signals and the cost of buying related devices may be reduced.

Figure 5:
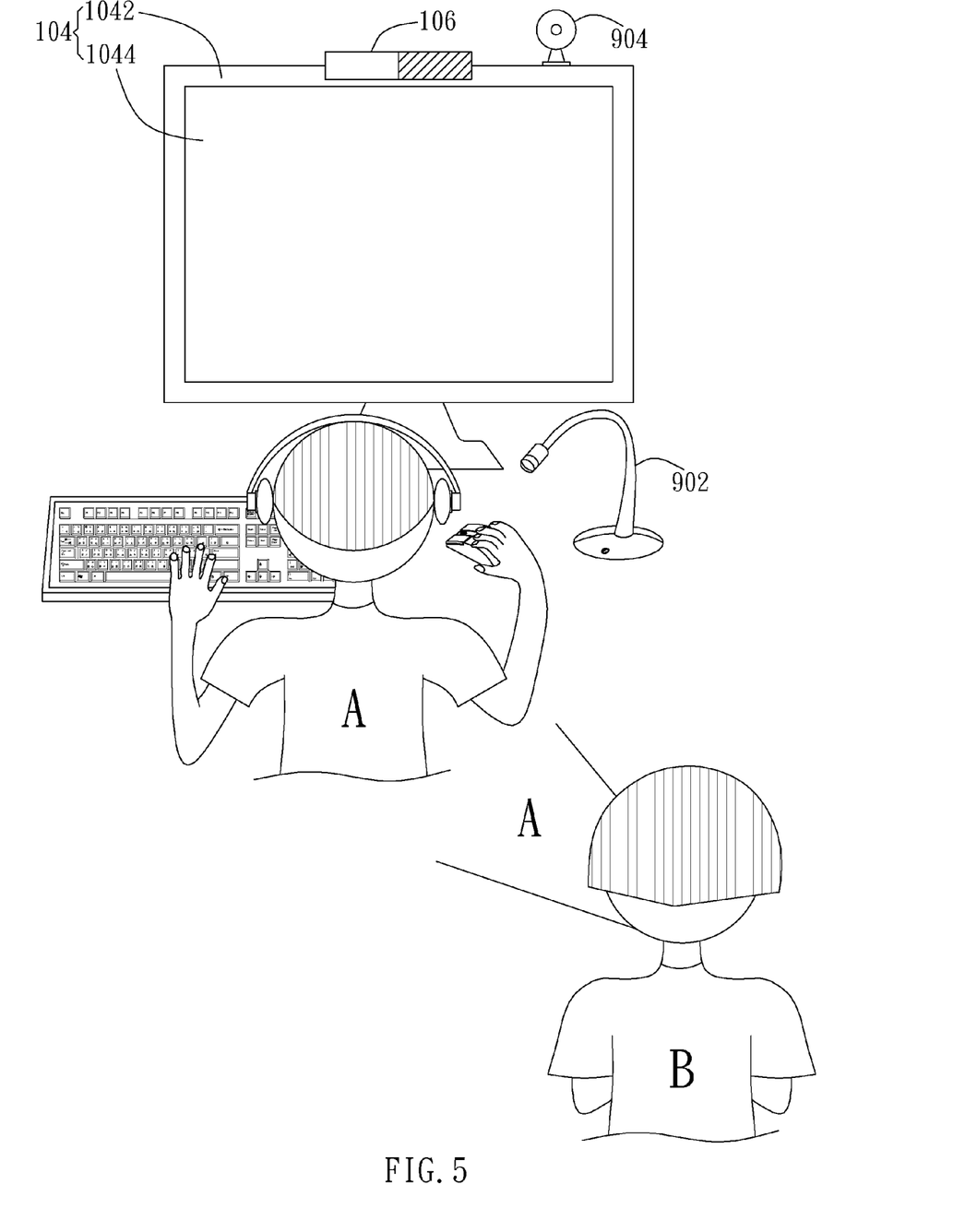
FIG. 5 is a schematic view of another embodiment of comparing and generating a notification signal.

FIG. 5 is a schematic view of an embodiment of "according to the external image or voice" to generate the alert signal. As shown in FIG. 5, the user (A) wears a headphone and is playing an online game without hearing his mother (B) calling him behind the door. This may cause the mother to complain or even forbid the user to playing the online game. In order to avoid such a situation, the user (A) can prerecords the voice or the image of his mother (B) into the storage unit 300, and turn a microphone 902 toward the door behind him for recording or position a web cam 904 toward the door behind him for retrieving images. When the user concentrates on playing the game, if the comparing unit 504 finds an ambient voice and/or image matching the voice and the image of the user's mother (B), the warning unit 106 may start to flash or the image frame may be switched to the warning display tone to notify the user of mother's coming. As such, the user can notice situations at the surrounding when he concentrates on the display screen 1044.

In addition, the user may prerecord the voice of his mother, and the voice pattern of his mother is stored as the first trigger signal (b1). Besides, the user may set the LEDs to flash red light for three seconds when the voice of his mother is detected. The user may execute the resident program of comparing the voice pattern (i.e. the signal retrieving unit 502) before playing the game, enable the microphone 902, and then execute the computer game. The resident program of comparing the voice pattern acts similar to the method described in FIG. 1B to compare waveforms between the trigger signal and the ambient audio received by the microphone 902. When the resident program of comparing the voice pattern compares and finds the ambient audio matching the voice pattern of the user's mother, the LED on the display flashes red light for three seconds, and the user can determine that his mother is calling him according to the flashing light without mixing up with other notification signals.

Figure 6:
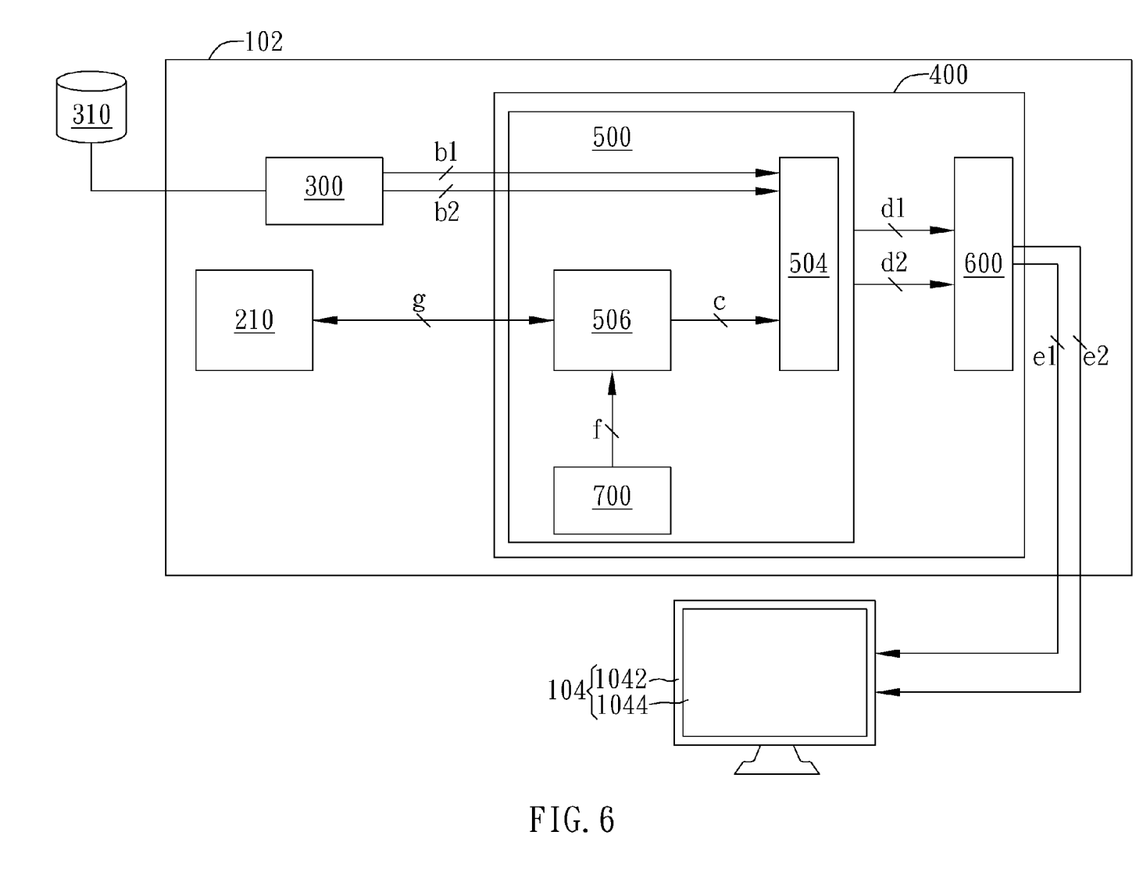
FIG. 6 is a schematic view of another embodiment of a computer system.

FIG. 6 is a schematic view of an embodiment of "setting contact person information as the trigger signal" in a computer system. The function of the processing device 102, the display 104, the case 1042, the display screen, and the storage unit 300 are similar to corresponding devices in FIG. 1A. The processing device 102 additionally includes a network signal informing end 210, and the storage unit 300 can obtain contact person information (such as instant message of Messenger, account number of Skype, or e-mail address), which is set by the user, as the first trigger signal (b1) and the second trigger signal (b2). For example, the first trigger signal (b1) is the account number of Skype of contact person (A) in the address book, and the second trigger signal (b2) is the e-mail address of contact person (B) in the address book. When the processing device 102 outputs the first notification signal (d1) and the second notification signal (d2) to the display 104, different LEDs on the case 1042 start to flash light as the first alert signal and the second alert signal and will not stop flashing until the user presses the keyboard or the mouse. As such, the user can notice lights of the warning unit 106 on the case 1042 farther from him and recognize whether the processing device 102 presently receives messages of Messenger or emails from the contact person (A) or (B) even when (a) an image display circuit of the display 104 is in a power-saving state and the display 104 stops displaying the image frame, or when (b) the user temporarily leaves the seat, not sitting in front of the display 104 watching the display screen 1044.

The detailed operating steps in the present embodiment includes:
(a) the user can preset the e-mail address of the specific contact person (A) as the first trigger signal (b1) and set LEDs on the case 1042 to flash as the first alert signal and stop flashing as the user presses the keyboard and the mouse.
(b) if the processing device 102 executes Microsoft Widows, the user can set a turn-off time of the display 104 in five minutes by the power option in the control panel.
(c) when the user leaves the seat or does not operate the mouse or the keyboard over five minutes, the processing device 102 stops outputting image synchronous signals, Vsync and Hsync, to the display, and the display is in a sleep mode while the processing device 102 is still running to receive new messages of Messenger and new e-mails.
(d) the first notification signal (d1)) is generated when the processing device 102 receives a notification of incoming e-mail (an event signal (g)), and the e-mail address matches that of the contact person (the first trigger signal (b1)). Then the control module 600 transmits the first displaying signal (e1) to the display 104 by a display data channel command interface (DDC-CI) between the processing device 102 and the display 104, so that the LEDs on the case 1042 start to flash.

As such, the display 104 need not activate image-display related units (such as LCD panel, backlight, and scalar IC) and is still in the power-saving mode, but the user has been informed of the incoming e-mail by the flashing light of LEDs. The LEDs can keep flashing light until the user wants to further confirm the content of the received message and goes back to the processing device 102 to press the mouse or the keyboard which leads the processing device 102 to output Vsync and Hsync signals, so that the display screen 1044 will display image frame again.

As shown in FIG. 6, in the computer system 100, the network signal informing end 210 transmits the event signal (g). The comparing module 500 receives the event signal (g) and the first trigger signal (b1). The comparing module 500 utilizes the signal status detecting module 506 to receive the event signal (g) to form the comparison signal (c). The comparing unit 504 compares the first trigger signal (b1) with the comparison signal (c). The comparing module 500 and the control module 600 are preferably application programs executed in the processing device 102. The human machine interface program 400, which is executed in the processing device 102, includes the comparing module 500 and the control module 600. The human machine interface program 400 is resided and executed in a random access memory.

It is noted that upon the receipt of event signal (g) by the comparing module 500, the potential actions can further be classified into two ways. One way is immediately waking up the comparing module 500 in the standby state after the event signal (g) such as e-mail and message is received by the network signal informing end 210 through Internet. For example, if the modem module receives an incoming e-mail, a command (such as AT-command) is outputted to wake up a host in the sleep state. The other way is transmitting a paging signal (f) by a paging module 700 to wake up the comparing module 500. The time interval of waking up the comparing module 500 by the paging module 700 may be set according to requirements. As such, when the processing device 102 is in the sleep state, the user can rapidly recognize whether the processing device 102 presently receives messages of Messenger or e-mails from the contact person (A) or contact person (B) without repeatedly activating the instant message program, such Skype or Messenger, of the processing device 102 in the sleep state or activating the email application, such as Outlook, to check if there is any incoming email.

The first notification signal (d1) is generated when the comparing unit 504 detects the name (the first trigger signal (b1)) of the contact person (A) is in the account column (the comparison signal (c)) of an incoming Messenger message (the event signal (g)) just received. The control module 600 generates the first displaying signal (e1) to display the first alert signal through the warning unit 106 of the case 1042.

Similarly, the second notification signal (d2) is generated when the comparing unit 504 detects the name (the first trigger signal (b2)) of the contact person (B) is in the e-mail address column (the comparison signal (c)) of an incoming e-mail (the event signal (g)) just received. The control module 600 generates the second displaying signal (e2) to display the second alert signal through the warning unit 106 on the case 1042. In addition to the name and the e-mail address, the first trigger signal (b1) and the second trigger signal (b2) may be an account number of Messenger, the account number of Skype, or other identification data able to serve as update source of the first trigger signal (b1) and the second trigger signal (b2).

Figure 7:
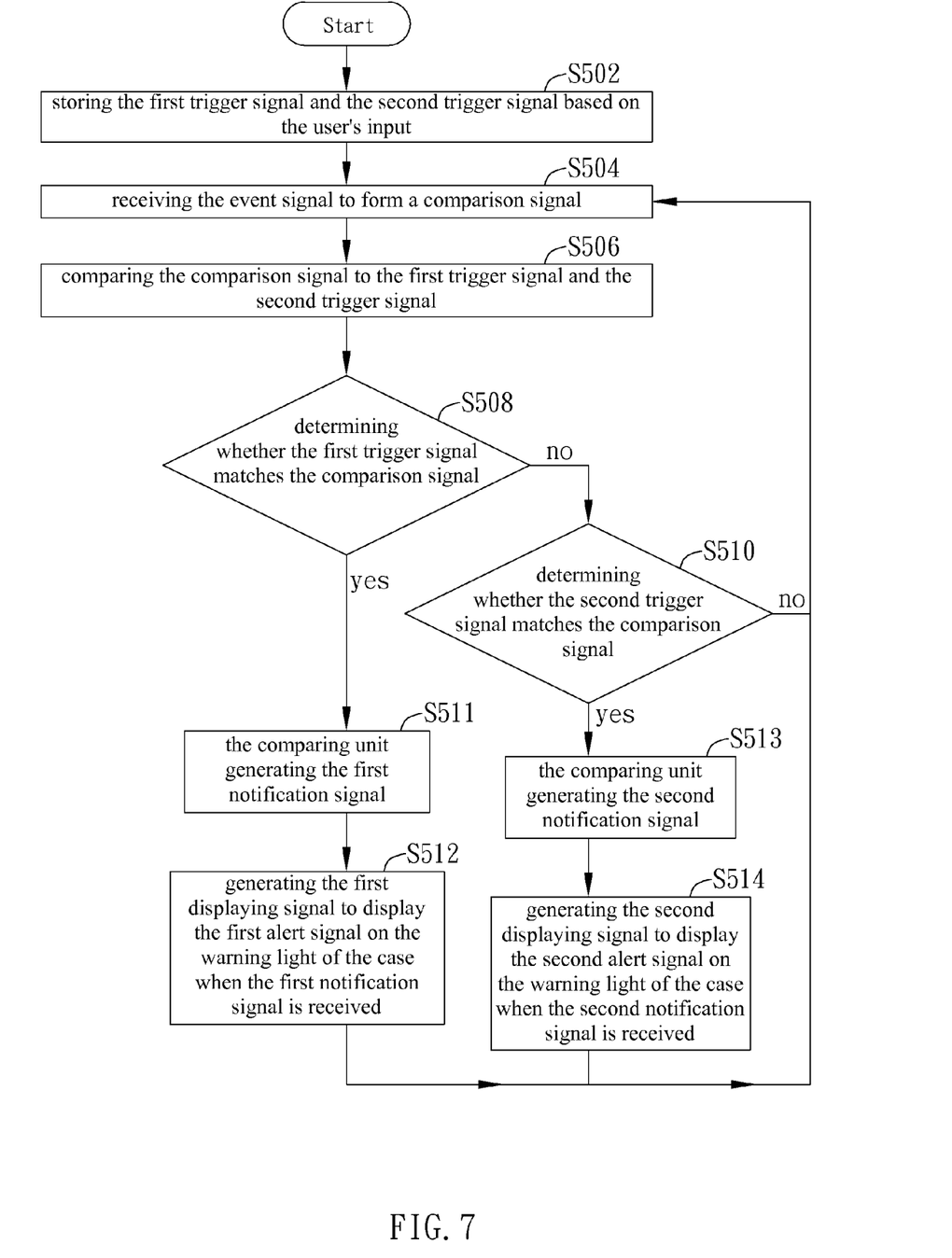
FIG. 7 is a flowchart of an embodiment of detecting an event signal to generate a notification signal.

FIG. 7 is a flowchart of an embodiment of "setting the contact person information as the trigger signal". As shown in FIG. 7, detecting the event signal includes the following steps: S502: storing the first trigger signal (b1) and the second trigger signal (b2) based on the user's input; S504: receiving the event signal (g) to form a comparison signal (c); S506: comparing the comparison signal (c) to the first trigger signal (b1) and the second trigger signal (b2); S508: determining whether the first trigger signal (b1) matches the comparison signal (c); S510: determining whether the second trigger signal (b2) matches the comparison signal (c); S511: the comparing unit generating the first notification signal (d1); S512: generating the first displaying signal (e1) to display the first alert signal on the warning unit 106 of the case when the first notification signal (d1) is received; S513: the comparing unit generating the second notification signal (d2); and S514: generating the second displaying signal (e2) to display the second alert signal on the warning unit 106 of the case when the second notification signal (d2) is received.

In the embodiment of "setting the contact person information as the trigger signal", the method of changing the state of the warning unit 106 based on the first displaying signal (e1) and the second displaying signal (e2) is similar to the method described in FIGS. 4A and 4B, such as changing color, location, flashing frequency, and quantity of lighting devices (such as LEDs), and will not be elaborated hereinafter.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A human machine interface coupled to a signal source, the signal source transmitting a monitored signal, the human machine interface comprising:
   a case;
   a display unit displaying the monitored signal;
   a recoding module provided for a user to record a first trigger signal;
   a storage unit storing the first trigger signal;
   a comparing module comparing the first trigger signal with the monitored signal, the comparing module generating a notification signal when the comparing module detects the first trigger signal appearing in the monitored signal; and
   a control module receiving the notification signal from the comparing module and generating a first alert signal, the first alert signal being displayed on the human machine interface,
   wherein the human machine interface is coupled to a processing device, the signal source is a multimedia display program, a game program, or an operating system, the monitored signal is an output signal from a sound effect device in the processing device.

2. The human machine interface of claim 1, wherein the comparing module comprises:
   a signal retrieving unit having a time-window, the time-window is able to move along a time axis, the signal retrieving unit retrieving the monitored signal within the time-window to form a comparison signal; and
   a comparing unit comparing the first trigger signal and the comparison signal and determining the first trigger signal appearing in the monitored signal when the first trigger signal and the comparison signal substantially match.

3. The human machine interface of claim 2, wherein the storage unit further stores a second trigger signal; when the first trigger signal and the comparison signal substantially match, the first alert signal is generated; when the second trigger signal and the comparison signal substantially match, a second alert signal is generated, wherein the first alert signal and the second alert signal are different.

4. The human machine interface of claim 2, wherein the storage unit further stores a second trigger signal; when the first trigger signal and the comparison signal substantially match, the first alert signal is generated; when the second trigger signal and the comparison signal substantially match, the first alert signal is terminated.

5. The human machine interface of claim 1, wherein the human machine interface is coupled to a processing device; the signal source is a microphone or a camera coupled to the processing device; the monitored signal is an ambient sound or image.

6. The human machine interface of claim 1, further comprising a warning unit disposed on the case, wherein the control module alters a status of the warning unit as the first alert signal based on the notification signal.

7. The human machine interface of claim 1, wherein the first alert signal is displayed for a predetermined period and then stops being displayed automatically.

8. The human machine interface of claim 1, wherein the control module changes display characteristics of a image frame as the first alert signal based on the notification signal without changing content displayed in the image frame.

9. The human machine interface of claim 8, wherein the first alert signal switches from a normal display tone to a warning display tone without changing content displayed in the image frame.

10. An alert signal display method for a human machine interface comprising a case, the human machine interface coupled to a signal source, the signal source transmitting a monitored signal, the method comprising:
    (a) recording a first trigger signal by a recoding module and storing the first trigger signal in a storage unit;
    (b) displaying the monitored signal by a display unit and comparing the first trigger signal with the monitored signal by a comparing module, when the first trigger signal appears in the monitored signal, generating a notification signal; and
    (c) when receiving the notification signal, generating a first alert signal, wherein the first alert signal is displayed on the human machine interface; the human machine interface is coupled to a processing device, the signal source is a multimedia display program, a game program, or an operating system, the monitored signal is an output signal from a sound effect device in the processing device.

11. The alert signal display method of claim 10, wherein the step (a) further comprises: retrieving a part of the monitored signal in advance to form the first trigger signal and storing the first trigger signal in the storage unit.

12. The alert signal display method of claim 10, wherein the step (b) further comprises:
    regularly retrieving the monitored signal within a time-window to form a comparison signal; and
    comparing the first trigger signal with the comparison signal within the time-window.

13. The alert signal display method of claim 10, wherein the step (c) further comprises: altering a status of a warning unit as the first alert signal based on the notification signal.

14. The alert signal display method of claim 10, wherein the step of generating the first alert signal further comprises: setting a second trigger signal; when the first trigger signal and the monitored signal substantially match, generating the first alert signal; when the second trigger signal and the monitored signal substantially match, generating a second alert signal, wherein the first alert signal and the second alert signal are different.

15. The alert signal display method of claim 10, wherein the step of generating the first alert signal further comprises:
    setting the first trigger signal and a second trigger signal; when the first trigger signal and the monitored signal substantially match, generating the first alert signal; when the second trigger signal and the monitored signal substantially match, terminating the first alert signal.

16. The alert signal display method of claim 10, wherein the human machine interface further comprises a display screen disposed on the case to display an image frame, wherein the step (c) further comprises: the first alert signal is displayed in the image frame or by a warning unit on the case.

17. The alert signal display method of claim 16, wherein the step (c) further comprises: the notification signal changes display characteristics of the image frame as the first alert signal without changing content displayed in the image frame.

18. A human machine interface coupled to a network signal informing end, the network signal informing end transmitting an event signal, the human machine interface comprising:
a case;
a storage unit storing a first trigger signal;
a comparing module comparing the first trigger signal with the event signal, the comparing module generating a notification signal when the first trigger signal and the event signal substantially match; and
a control module receiving the notification signal from the comparing module and generating a first alert signal, the first alert signal being displayed on the case,
wherein the human machine interface is able to enter or leave an energy saving state; the human machine interface is coupled to the network signal informing end through a processing device; the processing device is able to output a wake-up command to request the human machine interface leave the energy saving state; wherein when the human machine interface is in the energy saving state, the human machine interface stops working, and the first alert signal is displayed on the case;
when the human machine interface receives the wake-up command and leaves the energy saving state, the human machine interface returns to work and stops displaying the first alert signal.

19. The human machine interface of claim 18, wherein the human machine interface further comprises:
a display screen disposed on the case, the display screen is able to display an image frame;
when the human machine interface is in the energy saving state, the display screen stops displaying the image frame, and the first alert signal is displayed on the case;
when the human machine interface receives the wake-up command and leaves the energy saving state, the human machine interface returns to display the image frame and stops displaying the first alert signal.

20. The human machine interface of claim 19, wherein the wake-up command is Vsync and Hsync synchronization signals transmitted by the processing device, and the Vsync and Hsync synchronization signals allow the display screen to normally display the image frame.

21. The human machine interface of claim 18, wherein the comparing module comprises:
a signal state detecting module detecting the event signal to form a comparison signal; and
a comparing unit comparing the first trigger signal and the comparison signal, wherein when the first trigger signal and the comparison signal substantially match, the first trigger signal is determined appearing in the event signal.

22. The human machine interface of claim 18, further comprising a warning unit disposed on the case, the control module altering a status of the warning unit as the first alert signal based on the notification signal.

23. The human machine interface of claim 18, wherein the storage unit further stores a second trigger signal; when the first trigger signal and the comparison signal substantially match, the first alert signal is generated; when the second trigger signal and the comparison signal substantially match, a second alert signal is generated, wherein the first alert signal and the second alert signal are different.

24. The human machine interface of claim 18, wherein the first trigger signal is contact person information obtained from a user's address book including at least one of e-mail addresses, names, or instant message accounts.

25. A human machine interface coupled to a network signal informing end, the network signal informing end transmitting an event signal, the human machine interface comprising:
a case;
a storage unit storing a first trigger signal;
a comparing module comparing the first trigger signal with the event signal, the comparing module generating a notification signal when the first trigger signal and the event signal substantially match;
a control module receiving the notification signal from the comparing module and generating a first alert signal, the first alert signal being displayed on the case; and
a paging module outputting a paging signal to awaken the comparing module, wherein when the paging module awakes the comparing module, the comparing module retrieves the event signal and the first trigger signal.

26. An alert signal display method for a human machine interface comprising a case, the method comprising:
(a) storing a first trigger signal in a storage unit;
(b) receiving an event signal to form a comparison signal;
(c) comparing the first trigger signal with the comparison signal, when the first trigger signal and the comparison signal substantially match, generating a notification signal; and
(d) when receiving the notification signal, generating a first alert signal, the first alert signal being displayed on the case,
wherein the comparing step comprises: waking-up a comparing module by a paging module to retrieve the event signal and the first trigger signal; and
outputting the event signal to form the comparison signal.

27. The alert signal display method of claim 26, wherein the step (d) further comprises: altering a status of a warning unit as the first alert signal based on the notification signal.

28. The alert signal display method of claim 26, wherein the step of generating the first alert signal further comprises: setting a second trigger signal; when the first trigger signal and the comparison signal substantially match, generating the first alert signal; when the second trigger signal and the comparison signal substantially match, generating a second alert signal, wherein the first alert signal and the second alert signal are different.

* * * * *